United States Patent [19]
Kosmal

[11] Patent Number: 5,777,234
[45] Date of Patent: Jul. 7, 1998

[54] PRE-STRAINING APPARATUS AND METHOD FOR STRAIN SENSORS

[75] Inventor: Alfred J. Kosmal, Mt. Vernon, Wash.

[73] Assignee: Kistler-Morse Corporation, Bothell, Wash.

[21] Appl. No.: 690,757

[22] Filed: Aug. 1, 1996

[51] Int. Cl.[6] .................. G01R 7/16; G01L 1/100
[52] U.S. Cl. .................. 73/765; 73/768; 73/775
[58] Field of Search .................. 73/760, 763, 765, 73/774, 768, 775, 777, 785, 786, 1.15

[56] References Cited

U.S. PATENT DOCUMENTS

| | | | |
|---|---|---|---|
| 3,848,462 | 11/1974 | McLirathe | 73/781 |
| 4,064,744 | 12/1977 | Kistler | 73/777 |
| 4,292,835 | 10/1981 | Bickford | 73/761 |
| 4,711,131 | 12/1987 | Hopkins | 73/799 |
| 4,996,882 | 3/1991 | Kistler | 73/777 |
| 5,230,392 | 7/1993 | Tremblay | 73/782 |
| 5,355,715 | 10/1994 | Rausche et al. | 73/1 B |
| 5,589,640 | 12/1996 | Butler | 73/785 |

*Primary Examiner*—George M. Dombroske
*Assistant Examiner*—Max H. Noori
*Attorney, Agent, or Firm*—Seed and Berry LLP

[57] ABSTRACT

A method and apparatus for pre-straining a bolt-on strain sensor. The pre-strain is preferably adjusted by inserting a strain adjusting tool through strain adjusting holes in the sensor and the structural member. The portion of the tool engaging the sensor is preferably offset from the portion of the tool engaging the hole in the support structure to provide a camming function. After the strain has been adjusted to a desired value, a bolt adjacent the strain adjusting hold of the sensor is tightened to fixedly secure the sensor to the support structure and maintain the preadjust strain at the desired value.

24 Claims, 8 Drawing Sheets

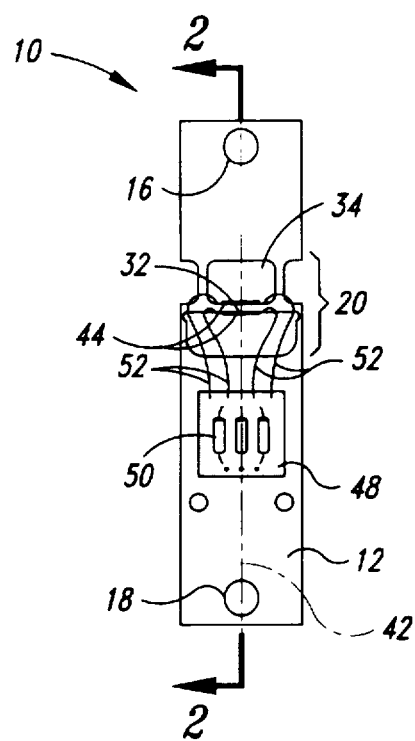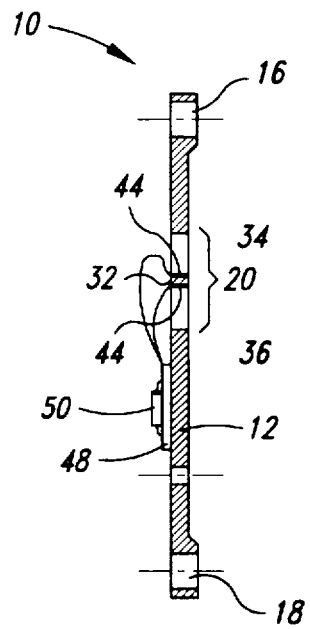
Fig. 1
(PRIOR ART)
Fig. 2
(PRIOR ART)

PRE-STRAINING APPARATUS AND METHOD FOR STRAIN SENSORS

TECHNICAL FIELD

This invention relates to strain sensors for sensing strains induced by forces and weights, and more particularly to a bolt-on strain sensor incorporating an adjustable pre-straining mechanism.

BACKGROUND OF THE INVENTION

Several methods and technologies have been developed for measuring the contents of large silos or bins used to store bulk materials such as minerals, coal, plastics, chemicals and the like. One approach to determining the material level in vessels is through the use of mechanical devices or through ultrasonic sounding. Another method for measuring the contents of large silos involves weighing the contents of the vessels. These methods become difficult and impractical, however, when the contents are stored in large, tall silos or other similarly large vessels.

Recently, bolt-on weighing has become a popular approach to measuring the contents of vessels. This method consists of bolting strain sensors to the support structures of vessels. The contents of a vessel can be determined by monitoring the electrical output that is the direct result of strain measurements taken from one or more strain sensors coupled to the support structure of the vessel. By measuring the amount of axial strain in the support structure as material is added or removed from the vessel, the weight of the contents can be determined.

A conventional single access bolt-on strain sensor 10 is illustrated in FIGS. 1 and 2. The strain sensor 10 includes a sensor body 12 having a pair of spaced apart mounting holes 16, 18 separated from each other by a measurement zone 20. The measurement zone 20 includes an elongated measurement beam 32 connected to a portion of the sensor body 12 containing the mounting hole 16 by a first pair of interconnecting members 34. A second pair of interconnecting members 36 connects the other portion of the measurement body 12 to the opposite side of the measurement beam 32. As is apparent from FIG. 1, the first interconnecting members 32 are separated from each other by a distance that is smaller than the separation of the second interconnecting members 36. Also, all of the interconnecting members 32, 36 are equally spaced from an axis of sensitivity 42 (FIG. 1) that extends along a line passing through the mounting holes 16, 18. Strain sensing elements 44, such as strain gauges, are mounted on opposite sides of the measurement beam 32. A printed circuit board 48 having a plurality of components 50 mounted thereon is attached to the sensor body 12 adjacent the measurement zone 20. The electrical components 50 are connected to the strain sensing elements 44 by wires 52.

In operation, the strain sensor 10 is bolted to a structural support, with the axis of sensitivity 42 extending along the principal axis of the structural support. The principal strain occurring in the structural support is thus imparted to the strain sensor 10 between the mounting holes 16, 18. As the mounting holes 16, 18 move toward and away from each other, the motion is imparted to the measurement beam 32 through the interconnecting members 34, 36 thereby causing the measurement beam 32 to bend in opposite directions responsive to tension and compression, respectively. More particularly, as the mounting holes 16, 18 move toward each other, the center of the measurement beam 32 deflects toward the mounting hole 18. Conversely, as the mounting holes 16, 18 move away from each other, the center of the measurement beam 32 deflects toward the mounting hole 16. The magnitude and direction of the bending of the measurement beam 32 is measured by the strain sensing elements 44 in a conventional manner. The structure and operation of the strain sensor 10 illustrated in FIGS. 1 and 2 is described in greater detail in U.S. Pat. No. 4,064,744 to Kistler which is incorporated herein by reference.

The strain sensor 10 of FIG. 1 and 2 is used to measure the weight of material in a storage vessel as illustrated in FIG. 3. As illustrated in FIG. 3, a silo 70 contains material that is to be weighed. The silo 70 is supported by a plurality of silo support legs 74 resting on respective concrete pads 76. As the weight of the materials in the silo 70 increases, the compression in each support leg 74 increases along a principal axis extending in the vertical direction. As the weight of the material in the silo 70 is reduced, each support leg 74 expands along the vertical principal axis.

The prior art strain sensors 10 are mounted on a support leg 74 at location 80, as best illustrated in FIG. 4. The prior art bolt-on strain sensor 10 is installed by forming a pair of threaded holes 82, 84 in the support leg 74 along the vertical principal axis 86. The prior art bolt-on strain sensor 10 is then secured to the support leg 74 along the principal axis by bolting it to the threaded holes 82, 84.

The use of strain sensors to weigh the contents of vessels has several advantages over level sensing methods. First, the sensors are positioned on vessel support structures rather than inside vessels where the sensors may come in contact with the sometimes caustic or abrasive contents of vessels. Sensors can be damaged by being exposed to caustic or abrasive materials, particularly over a considerable period. In addition, bolt-on strain sensors require no cabling or instruments inside the vessel, and the sensors can be installed and serviced at ground level.

One problem with installing the conventional strain sensors 10 as shown in FIG. 4 arises because it is sometimes difficult to precisely locate the threaded holes 82, 84 so that the spacing between the holes 82, 84 is exactly equal to the spacing between the mounting holes 16, 18 of the strain sensor 10. Under these circumstances, the strain sensor 10 will be pre-strained.

Another difficulty encountered when installing the strain sensor 10 as illustrated in FIG. 4 is controlling the magnitude of the strain imparted to the sensor 10 at the time of installation. For example, it can be difficult to install the sensor 10 in either a relaxed, unstrained state or pre-strained to a desired state. In some cases, the surface irregularity of the support leg 74 or other structure and/or the torsion forces imparted by the bolting hardware result in high levels of unwanted strain.

The unwanted strain imparted to strain sensors 10 can result in premature sensor failure. For example, a sensor 10 used to monitor the level of materials in a silo 70 by sensing weight induced strains in the silo support legs 74 may have a maximum stress specification of +/−5000 psi (i.e., a stress change in the support structure higher than 5000 psi will result in a displacement of the sensor mounting holes 16, 18 that is beyond the specification limits, and the sensor 10 may fail). If, during the installation, the above-mentioned irregularities result in a displacement of the sensor mounting holes 16, 18 that is equivalent to a compressive stress of 2500 psi in the support leg 74, and an increased load causes the support leg 74 to compress an additional 4000 psi, the sensor 10 will have effectively been stressed to the sum, i.e., 6500 psi. The sensor 10 will be over stressed 1500 psi beyond the 5000 psi limit and may fail.

SUMMARY OF THE INVENTION

The inventive strain sensor is adapted to be pre-strained before being attached to a structural member. The strain sensor includes a strain adjusting hole and first and second mounting locations positioned along an axis of sensitivity. The strain sensor further includes a strain sensing element between the first and second mounting locations. The first strain sensing element generates an electrical output indicative of the relative position between the first and second mounting locations along the axis of sensitivity. The first and second mounting locations are spaced apart from each other by approximately the spacing between a pair of mounting locations formed in the structural member. The mounting locations of the strain sensor are attached to the mounting locations of the structural member by suitable means. Mounting holes may be formed in the strain sensor at the mounting locations of the sensor, and mounting holes may be formed in the structural member at the mounting locations of the structural member. The strain sensor may then be attached to the structural member by fasteners inserted into each of the mounting holes. A strain adjusting hole is formed in the structural member near the strain adjusting hole of the strain sensor. An adjusting tool may then engage the strain adjusting holes to apply a force to the strain sensor along the axis of sensitivity to adjust the strain on the strain sensor as it is attached to the structural member. The strain of the sensor is preferably monitored with an electronic indicator coupled to the strain sensor while the adjusting tool is applying a force to the strain sensor until the strain sensor has been securely attached to the structural member.

The strain adjusting hole in the strain sensor preferably has a diameter that is larger than the diameter of the strain adjusting hole in the structural member, and preferably has a center that is offset from the center of the strain adjusting hole in the strain sensor. The adjusting tool preferably comprises a generally L-shaped member having a handle portion and a working portion. The working portion may include a cylindrical distal end having a diameter approximately equal to the diameter of the strain adjusting hole in the structural member. The working portion also preferably includes a cylindrical cam member adjacent the cylindrical end of the working portion. The cylindrical cam member preferably has a diameter approximately equal to the diameter of the strain adjusting hole in the sensor body. The center of the cylindrical cam member is preferably offset from the center of the cylindrical end by substantially the same distance that the center of the strain adjusting hole in the structural member is offset from the center of the strain adjusting hole in the sensor body. The cylindrical distal end may then be inserted into the strain adjusting hole in the structural member and the cam member may be inserted into the strain adjusting hole in the sensor body. The handle portion is then rotated to cause the working portion to apply a relative force between the strain sensor and the structural member.

BRIEF DESCRIPTION OF THE DRAWINGS

FIG. 1 is front plan view of a conventional bolt-on strain sensor.

FIG. 2 is a cross-sectional view of the bolt-on strain sensor of FIG. 1 taken along the line 2—2.

DETAILED DESCRIPTION OF THE INVENTION

Figure 5:
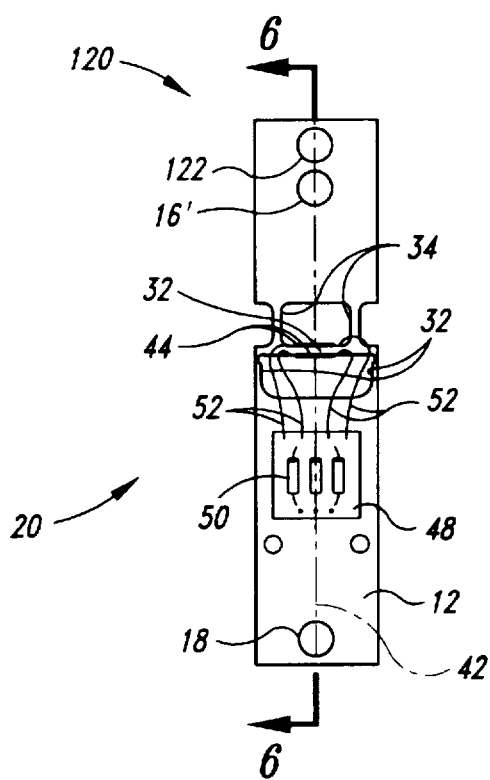
FIG. 5 is front plan view of a preferred embodiment of the inventive bolt-on strain sensor incorporating the inventive pre-straining feature.
Figure 6:
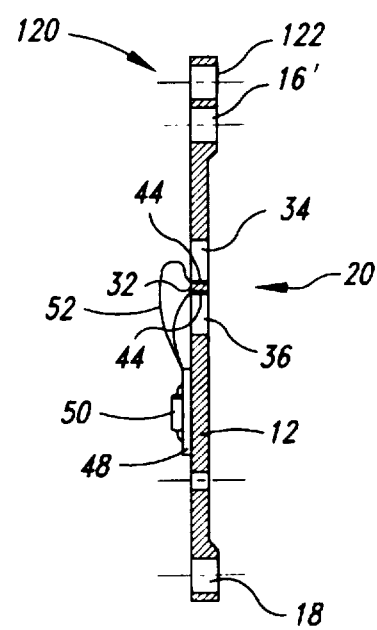
FIG. 6 is a cross-sectional view of the bolt-on strain sensor of FIG. 5 taken along the line 6—6.

A preferred embodiment of a strain sensor 120 in accordance with the invention is illustrated in FIGS. 5 and 6. The sensor 120 is somewhat similar to the prior art sensor 10 of FIGS. 1 and 2. Therefore, in the interest of brevity, identical components have been provided with the same reference numeral, and a description of their structure and operation will not be repeated. The preferred embodiment of the inventive strain sensor 120 illustrated in FIGS. 5 and 6 uses a mounting hole 16' that is spaced from the end of the sensor body 12 by a strain adjustment hole 122. As explained below, the strain adjustment hole 122 allows the strain imparted to the strain sensor 120 to be precisely adjusted as the strain sensor 120 is being attached to a support structure.

Figure 3:
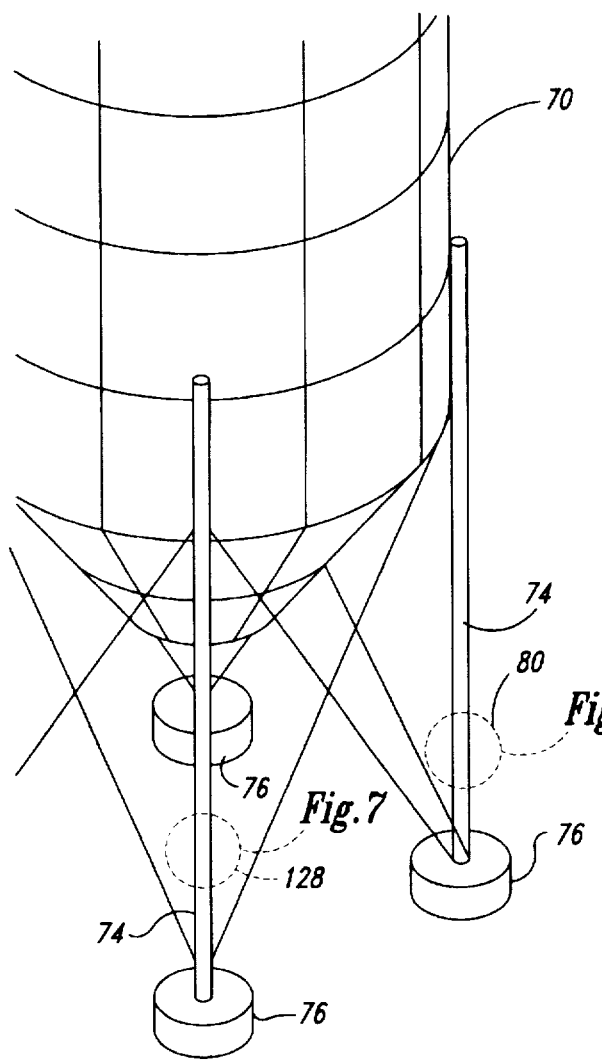
FIG. 3 is an isometric view of a storage vessel mounted on support legs of the type that can be instrumented with a strain sensor to measure the weight of material in the storage vessel.
Figure 4:
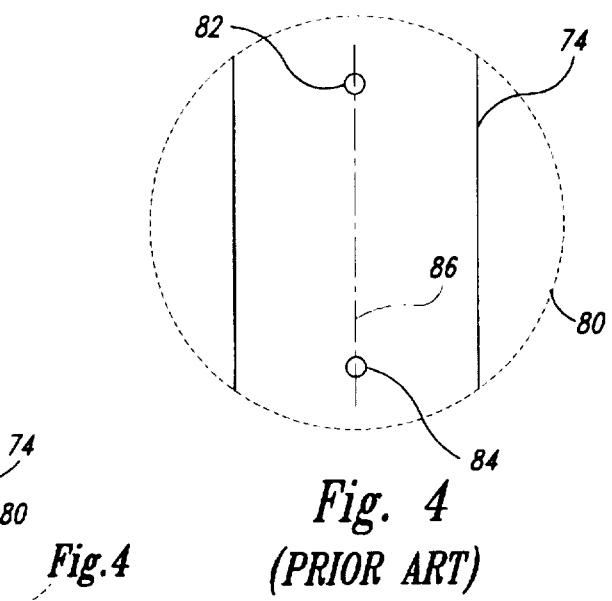
FIG. 4 is front plan view of a vessel support leg, showing drilled and tapped mounting holes for the bolt-on sensor shown in FIGS. 1 and 2.
Figure 7:
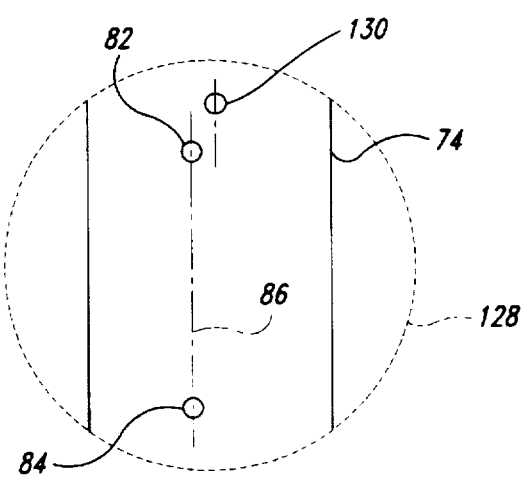
FIG. 7 is front plan view of a vessel leg showing drilled and tapped mounting holes for the bolt-on strain sensor of FIGS. 5 and 6, and a drilled hole for positioning a pre-straining tool.

The strain sensor 120 of FIGS. 5 and 6 is attached to a support leg 74 (FIG. 3) of a silo 70 at 128, as illustrated in FIG. 7. A pair of threaded holes 82, 84 are formed in the support leg 74 at locations spaced apart from each other by the spacing between the mounting holes 18, 16' of the strain sensor 120. However, a strain adjusting hole 130 is also formed in the support leg 74. The distance between the upper hole 82 and the strain adjustment 130 is preferably substantially equal to the distance between the mounting hole 16' of the sensor 120 and the strain adjustment hole 122. The strain adjustment hole 130 is preferably offset from the principal axis 86 of the support leg 74 for reasons which will be explained below.

Figures 8, 9:
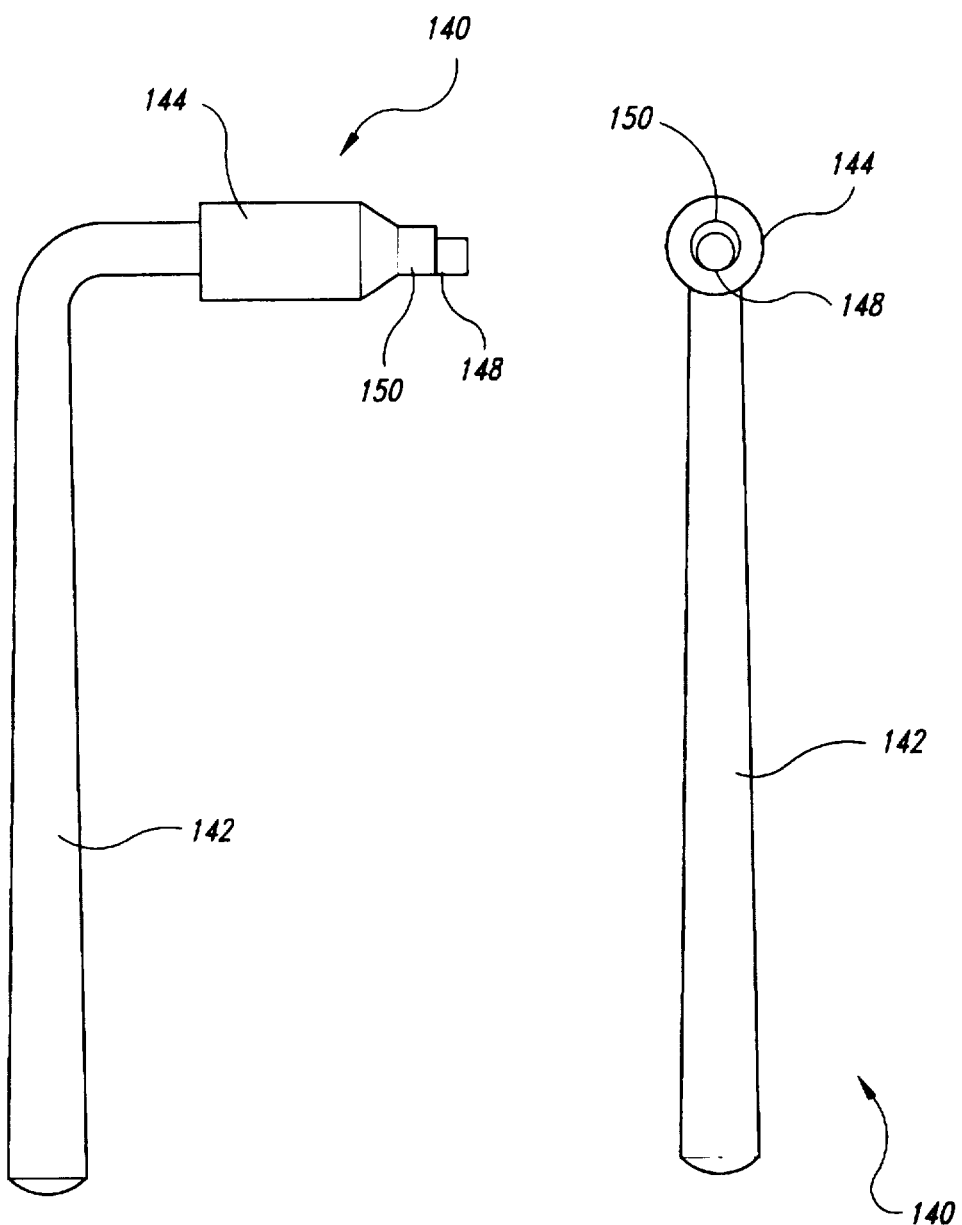
FIG. 8 is a side elevational view of a tool for pre-straining the bolt-on strain sensor of FIGS. 5 and 6 when mounting the strain sensor using the hole configuration shown in FIG. 7.
FIG. 9 is a front plan view of the pre-straining tool of FIG. 8.

The strain of the inventive strain sensor 120 is adjusted while it is being mounted on the support leg 70 as illustrated in FIG. 7 using a strain adjusting tool 140 illustrated in FIGS. 8 and 9. The strain adjusting tool 140 is formed by a generally L-shaped member having a handle portion 142 and a working portion 144. The working portion 144 has a cylindrical end 148 of relatively small diameter substantially equal to the diameter of the strain adjusting hole 130 formed in the support leg 74. Spaced from the end 148 of the working portion 144 is a cylindrical cam member 150 having a diameter substantially equal to the diameter of the strain adjusting hole 122 of the strain sensor 120. Significantly, the center of the cylindrical end 148 is offset from the center of the cylindrical cam member 150. The magnitude of this offset is preferably substantially equal to the offset of the center of the strain adjusting hole 130 formed in the support leg 74 from the principal axis 86, as illustrated in FIG. 7.

Figure 10:
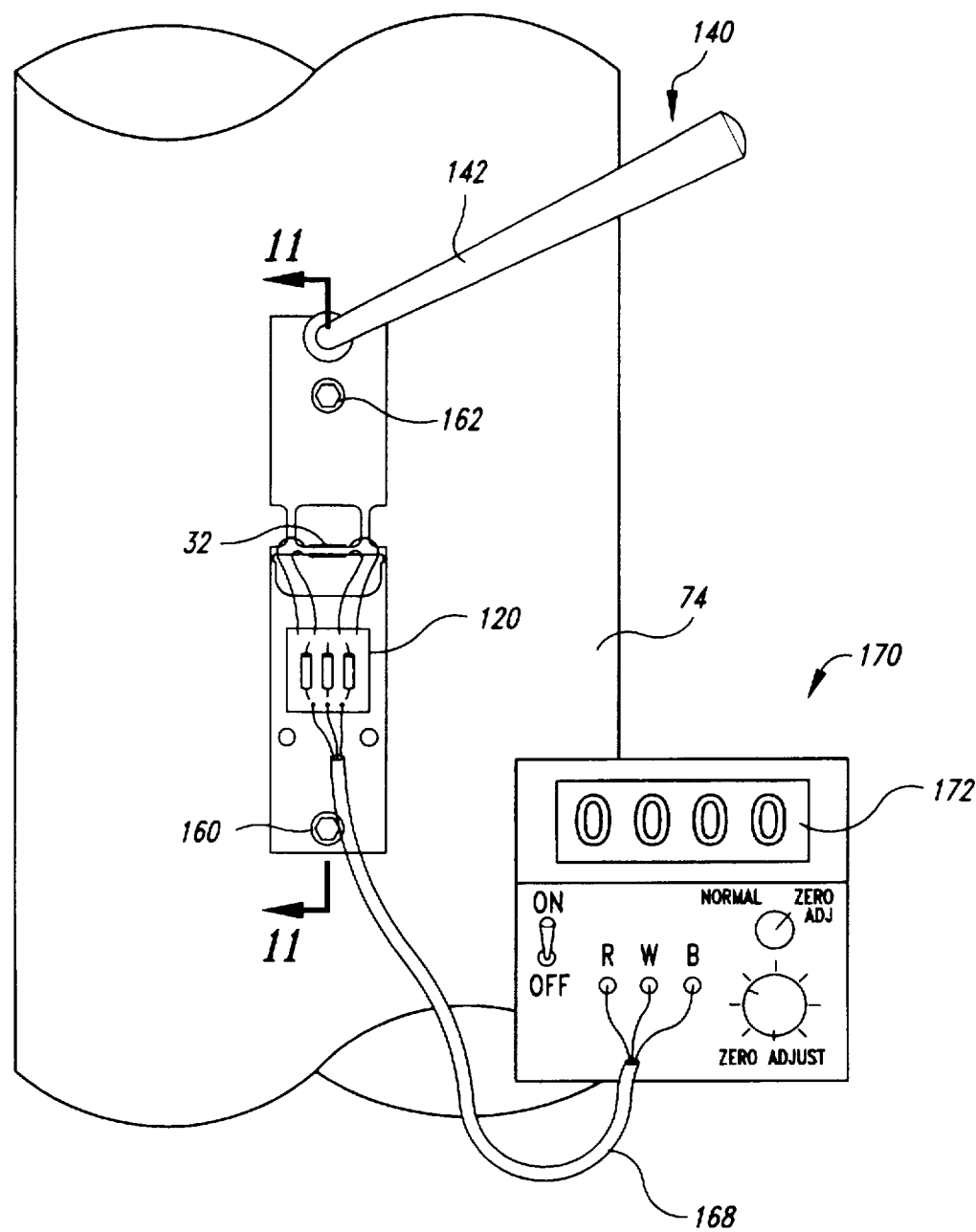
FIG. 10 is a front plan view showing the pre-straining tool of FIGS. 9 and 10 being used to adjust the strain of the bolt-on strain sensor of FIGS. 5 and 6 during installation while monitoring the strain measured by the sensor.
Figure 11:
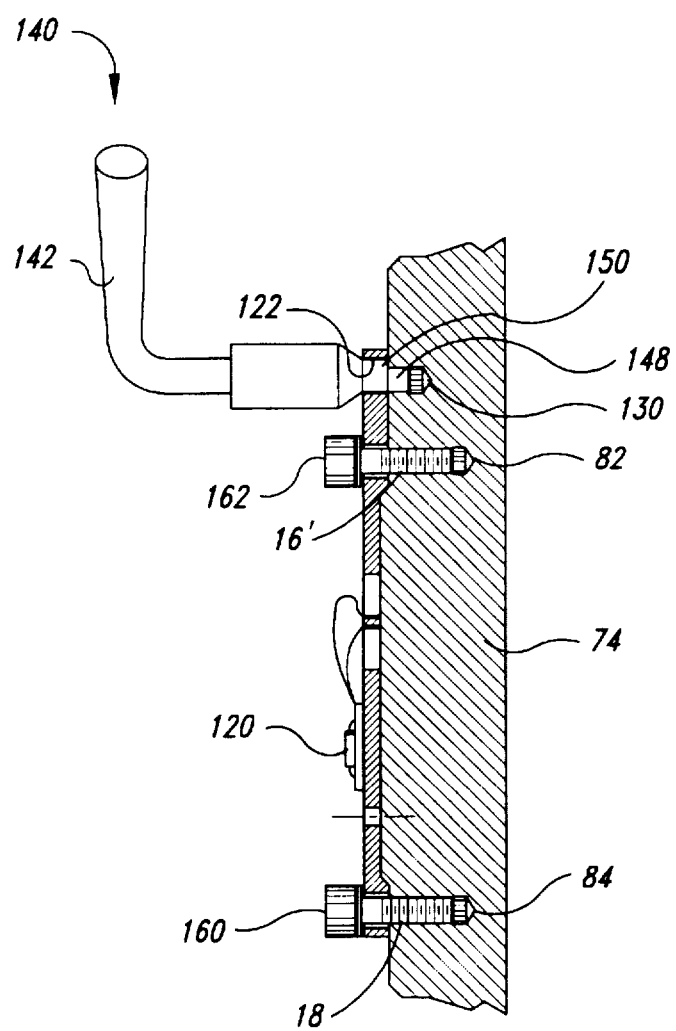
FIG. 11 is a cross-sectional view taken along the line 11—11 of FIG. 10.

The strain adjusting tool 140 is used to install the strain sensor 120 on the support leg 74 as illustrated in FIGS. 10 and 11. The strain sensor 120 is initially attached to the support leg 74 by placing a bolt 160 through the lower mounting hole 18 (FIG. 11) and then threading it into the bore 84 formed in the support leg 74. A second bolt 162 is then placed through the upper mounting hole 16' and threaded into the bore 82 formed in the support leg 74. However, the bolt 162 is not tightened at this time but is instead left sufficiently loose that the strain sensor 120 is free to move somewhat. Alternatively, the bolt 162 can be threaded into the bore 82 prior to threading the bolt 18 into the bore 84. In either case, after both of the bolts 160, 162 have been threaded into their respective bores 84, 82, the lower bolt 160 is tightened to fixedly attach the lower end of the sensor 120 to the support leg 74.

Prior to tightening the bolt 162, the sensor 120 is connected through a cable 168 to a conventional electronic indicator 170 having a digital readout 172 of the strain measured by the strain sensor 120. The strain adjusting tool 140 is then used to adjust the strain imparted to the sensor 120 as measured by the electronic indicator 170. More specifically, as best illustrated in FIG. 11, the relatively small diameter cylindrical end 148 of the strain adjusting tool 140 is inserted into the strain adjusting hole 130 formed in the support leg 74. In this position, the cylindrical cam member 150 extends through and engages the strain adjusting hole 122 in the sensor 120.

Figures 12A, 12B:
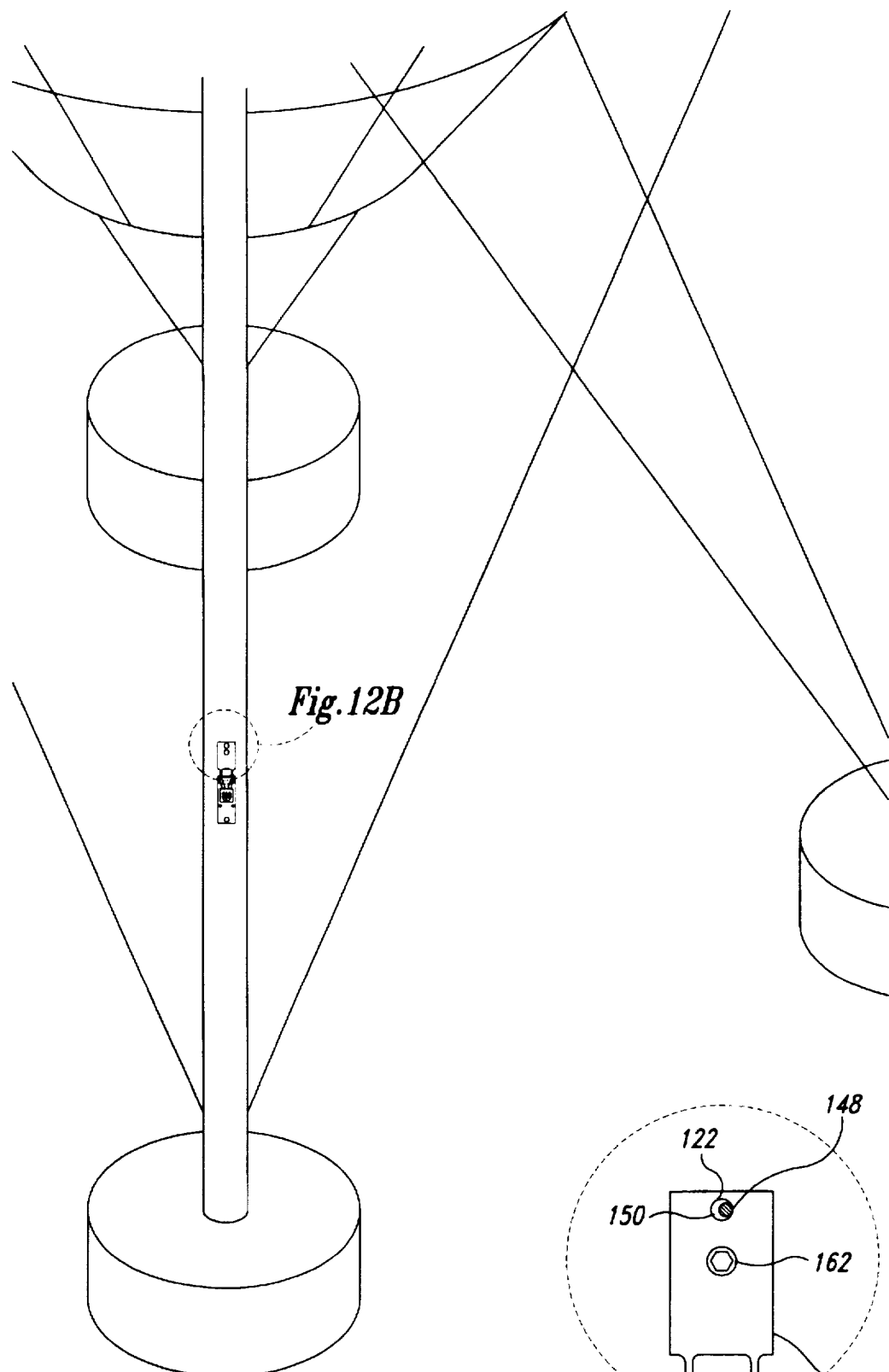
FIG. 12 is a front plan view illustrating the relative position of the strain adjustment hole in the support structure of FIG. 7 and the strain adjustment hole in the bolt-on strain sensor of FIGS. 5 and 6.
Figure 13A:
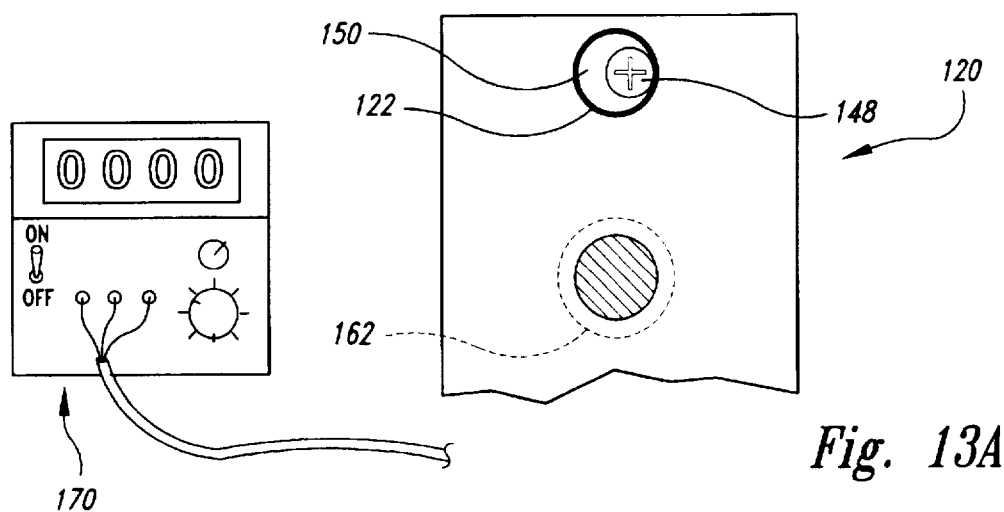
FIG. 13A, B, and C illustrate the manner in which the strain indicated by the strain sensor of FIGS. 5 and 6 varies responsive to prestraining of the sensor caused by rotating the pre-straining tool.
Figure 13B:
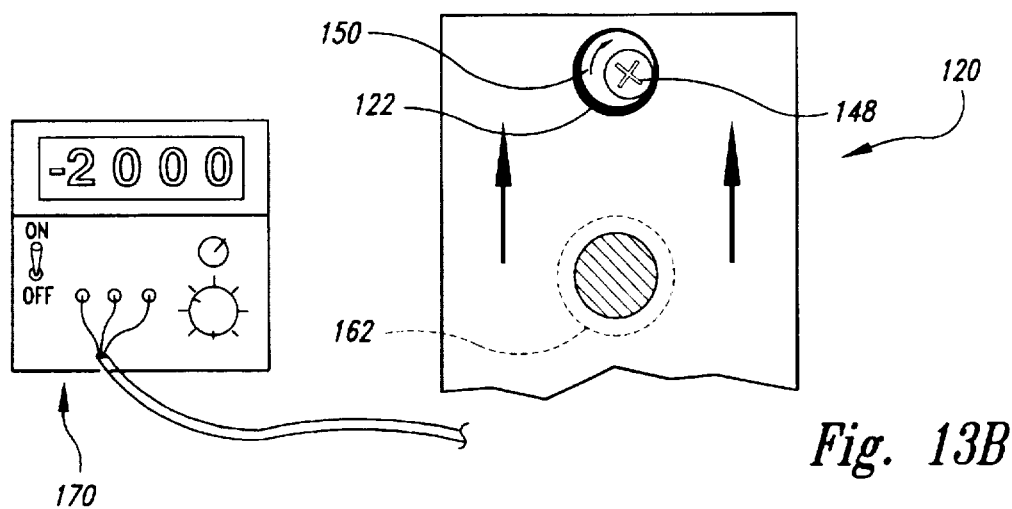
Figure 13C:
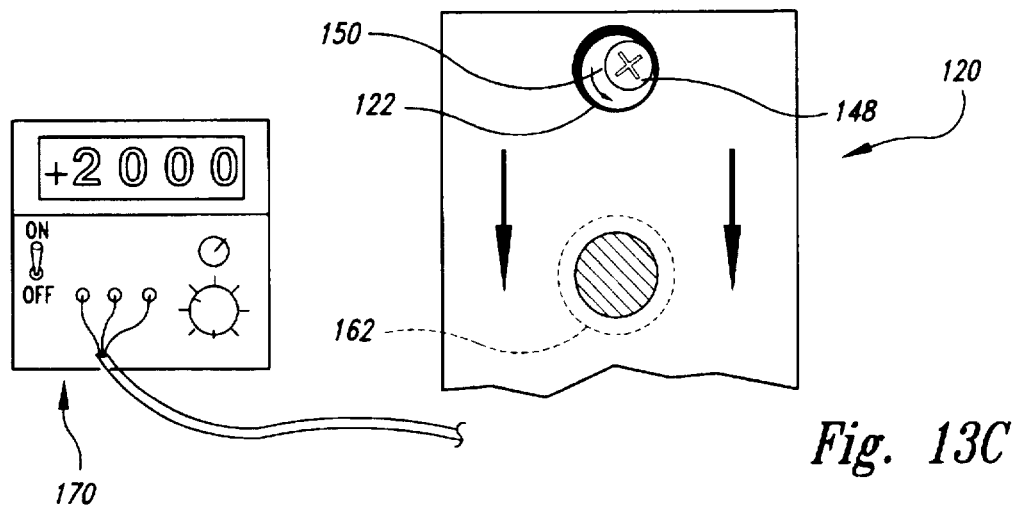

The positional relationship between the cylindrical end 148, the cylindrical cam member 150 and the strain adjusting hole 122 prior to making any adjustments is best illustrated in FIG. 12. Thereafter, the handle 142 of the strain adjusting tool 140 is rotated to positively or negatively pre-strain the strain sensor 120 as illustrated in FIGS. 13A–C. More specifically, the handle 142 is rotated from the initial position known in FIG. 13A in a clockwise direction to tension the strain sensor 120, as illustrated in FIG. 13B. In the example illustrated, the strain measured by the strain sensor 120 changes from 0 to –2000. Conversely, the handle 142 is rotated from the initial position shown in FIG. 13A in the counterclockwise direction to compress the strain sensor 120, as illustrated in FIG. 13C. In the example illustrated, the strain measured by the strain sensor 120 changes from 0 to +2000. It is also apparent from FIGS. 12 and 13A–C why the offset of the center of the cylindrical cam member 150 from the center of the cylindrical end 148 is substantially equal to the offset of the center of the strain adjusting hole 130 from the center of the threaded hole 82, as illustrated in FIG. 7. Maintaining the offsets equal prevents the strain adjusting tool 140 from applying torsional loads to the strain sensor 120 as long as the strain adjusting tool 140 is not rotated excessively, e.g., less than about 45 degrees. The maximum compressional or tensional strain is imparted to the strain sensor 120 when the strain adjusting tool 140 has been rotated 90 degrees. However, this at this time, the upper portion of the strain sensor 120 will have been shifted laterally a distance equal to the offset between the strain adjusting hole 130 and the threaded hole 82, thereby applying a torque to the bolt 160. This torque is generally undesirable since it affects the uniformity at which the measurement beam 32 bends responsive to strains. Thus, it is generally desirable to limit the rotation of the strain adjusting tool 140. During rotation of the strain adjusting tool 140, the digital readout 172 of the electronic indicator 170 is monitored until a desired strain is achieved. Generally, the desired pre-strain will be a function of the strain of the support structure to which the sensor 120 is attached. For example, assuming that the range of the sensor 120 is ±5000, the sensor 120 should be pre-strained to close to +5000 if a silo supported by the support structure is full at the time of installation. The sensor 120 can then be unloaded from +5000 to –5000 as material is removed from the silo. Conversely, the sensor 120 should be pre-strained to close to –5000 if the silo is empty at the time of installation. The sensor 120 can then be loaded from –5000 to +5000 as material is added to the silo.

After the strain adjusting tool 140 has been used to obtain a desired level of strain, the upper bolt 162 is tightened to fix the position of the upper end of the strain sensor 120 and maintain the strain imparted to the sensor 120 at the desired level. Thereafter, the strain imparted to the sensor 120 varies with changes in the strain in the support leg 74. After the bolt 162 has been tightened, the strain adjusting tool 140 can, of course, be removed.

It will be understood by one skilled in the art that substantial variations from the preferred embodiment illustrated in FIGS. 5—13 may be employed without departing from the concept of the invention. For example, strain sensors other than the strain sensor illustrated in FIGS. 5 and 6 may be used. Also, strain adjusting tools other than the strain adjusting tool 140 illustrated in FIGS. 8—13 may be used. For example, a blade-type strain adjusting tool could engage aligned slots formed in the sensor 120 and support leg 74 in order to adjust the strain imparted to the strain sensor 120. Also, of course, although bolts 160, 162 are preferred, other means could be employed to fasten and lower ends of the strain sensor 120 to respective mounting locations on a support structure such as, for example, other types of mechanical fasteners or even possibly fast-setting adhesives. Thus, from the foregoing, it will be appreciated that, although specific embodiments of the invention have been described herein for purposes of illustration, various modifications may be made without deviating from the spirit and scope of the invention. Accordingly, the invention is not limited except as by the appended claims.

I claim:

1. A pre-strainable, strain sensor adapted to be attached to a structural member, comprising:

a sensor body having first and second mounting locations positioned along an axis of sensitivity, said first and second mounting location adapted to be attached to said structural member;

a strain sensing element mounted on said sensor body between said first and second mounting locations, said first strain sensing element generating an electrical output indicative of the relative position between said first and second mounting locations along said axis of sensitivity; and a strain adjusting aperture formed in said sensor body at a location along said axis of sensitivity, said strain adjusting aperture and said structural member being engagable with an adjusting tool to apply a force to said sensor body along said axis of sensitivity to adjust the strain on said strain sensor.

2. The strain sensor of claim 1 wherein said strain adjusting aperture is substantially aligned with but slightly offset from said axis of sensitivity.

3. The strain sensor of claim 1 wherein said strain sensing element comprises:

a measurement beam extending perpendicular to its axis of sensitivity;

a pair of spaced apart, first interconnecting members extending parallel to each other and to the axis of sensitivity of said strain sensing element, said first interconnecting members extending between respective spaced apart locations on one side of said measurement beam to a first portion of said sensor body in which is positioned one of the mounting location through which said axis of sensitivity extends;

a pair of spaced apart, second interconnecting members extending parallel to each other and to the axis of sensitivity of said strain sensing element, said second interconnecting members extending between respective spaced apart locations on a side of said measurement beam opposite said first interconnecting members to a second portion of said sensor body in which is positioned the other of the mounting locations through which said axis of sensitivity extends, said second interconnecting members being spaced apart from each other by a distance that is greater than the spacing between said first interconnecting members; and a strain transducer mounted on said measurement beam.

4. The strain sensor of claim 1 wherein first and second mounting holes are formed at said first and second mounting locations, respectively so that said strain sensor may be attached to said structural member by respective threaded fasteners.

5. The strain sensor of claim 1 wherein said strain adjusting aperture comprises a cylindrical hole.

6. A system for measuring the strain in a structural member, comprising:

a pair of mounting locations on said structural member;

a strain sensor adapted to be attached to said structural member, said strain sensor having first and second mounting locations positioned along an axis of sensitivity, said first and second mounting locations being spaced apart from each other by approximately the spacing between the mounting locations in said structural member, said strains sensor further including a strain sensing element mounted between said first and second mounting locations, said first strain sensing element generating an electrical output indicative of the relative position between said first and second mounting locations along said axis of sensitivity, said strain sensor further including a strain adjusting aperture at a location along said axis of sensitivity;

a fastener adapted to attach respective mounting locations of said strain sensor to respective mounting locations of said structural member;

a strain adjusting recess formed in said structural member near the strain adjusting aperture in said strain sensor; and a strain adjusting tool adapted to engage said strain adjusting aperture and said strain adjusting recess to apply a strain adjusting force to said strain sensor along said axis of sensitivity.

7. The measuring system of claim 6 wherein the strain adjusting aperture in said strain sensor is aligned but slightly offset from with said axis of sensitivity.

8. The measuring system of claim 6 wherein said strain adjusting aperture and said strain adjusting recess are cylindrical.

9. The measuring system of claim 8 wherein the strain adjusting aperture in said strain sensor has a diameter that is larger than the diameter of the strain adjusting recess in said structural member.

10. The measuring system of claim 9 wherein the center of the strain adjusting recess in said structural member is offset from the center of the strain adjusting aperture in said strain sensor.

11. The measuring system of claim 10 wherein the center of the strain adjusting recess in said structural member is offset from the center of the strain adjusting aperture in said strain sensor in a direction perpendicular to said axis of sensitivity.

12. The measuring system of claim 8 wherein said strain adjusting tool comprises a generally L-shaped member having a handle portion and a working portion, the working portion including a cylindrical distal end having a diameter approximately equal to the diameter of the strain adjusting recess in said structural member, the working portion including a cylindrical cam member adjacent the cylindrical end of said working portion, said cylindrical cam member having a diameter approximately equal to the diameter of the strain adjusting aperture in said strain sensor, the center of the cylindrical cam member being offset from the center of said cylindrical end by substantially the same distance that the center of the strain adjusting recess in said structural member is offset from the center of the strain adjusting aperture in said strain sensor so that, when the cylindrical distal end is inserted into the strain adjusting recess in said structural member and the cam member is inserted into the strain adjusting hole in said strain sensor, rotation of the handle portion causes the working portion to apply a relative force between said strain sensor and said structural member.

13. The measuring system of claim 6 wherein said wherein said strain sensing element comprises:

a measurement beam extending perpendicular to its axis of sensitivity;

a pair of spaced apart, first interconnecting members extending parallel to each other and to the axis of sensitivity of said strain sensing element, said first interconnecting members extending between respective spaced apart locations on one side of said measurement beam to a first portion of said strain sensor in which is positioned one of the mounting locations through which said axis of sensitivity extends;

a pair of spaced apart, second interconnecting members extending parallel to each other and to the axis of sensitivity of said strain sensing element, said second interconnecting members extending between respective spaced apart locations on a side of said measurement beam opposite said first interconnecting members to a second portion of said strain sensor in which is positioned the other of the mounting locations through which said axis of sensitivity extends, said second interconnecting members being spaced apart from each other by a distance that is greater than the spacing between said first interconnecting members; and a strain transducer mounted on said measurement beam.

14. The measuring system of claim 6 wherein first and second mounting holes are formed at said first and second mounting locations of said strain sensor, and first and second mounting holes are formed at said first and second mounting locations of said structural member so that said strain sensor may be attached to said structural member by respective threaded fasteners inserted through the mounting holes in said strain sensor and threaded into the mounting holes formed in said structural member.

15. The measuring system of claim 14 wherein threads are formed in the mounting holes in said structural member, and wherein said fasteners comprise bolts inserted through respective mounting holes in said sensor body and threaded into respective mounting holes of said sensor body to engage the treads formed in the mounting holes in said structural member.

16. The measuring system of claim 6 further comprising an electronic indicator coupled to said strain sensing element, said electronic indicator providing said indication of the strain of said sensor body responsive to the electrical signal received from said strain sensing element.

17. A method of installing a strain sensor on a structural member to measure the strain of said structural member, said method comprising:

provYouing a strain sensor having first and second mounting locations positioned along an axis of sensitivity, said sensor generating an output signal indicative of the distance between said first and second mounting locations, said strain sensor further including a strain adjusting aperture positioned along said axis of sensitivity closer to the first mounting location than to the second mounting location;

forming a strain adjusting recess in said structural member;

attaching the second attachment location of said strain sensor to a second attachment location of said structural member to fix the position of the strain sensor at the second mounting location of said strain sensor;

engaging the strain adjusting recess of said structural member and the strain adjusting aperture of said strain sensor with a strain adjusting tool, and applying a force to said strain adjusting tool causing said strain adjusting tool to apply a force to said strain sensor along said axis of sensitivity; and while applying said force to said strain adjusting tool, attaching the first attachment location of said strain sensor to a first attachment location of said structural member, the first and second mounting locations of said structural member being spaced apart from each other by approximately the spacing between the first and second mounting locations of said strain sensor, thereby pre-straining said strain sensor.

18. The method of claim 17 further including the steps of coupling an electronic indicator to said strain sensing to provide an indication of the strain of said strain sensor, and monitoring said electronic indicator while applying said force to said strain adjusting tool until the first mounting location of said strain sensor has been attached to the first mounting location of said structural member.

19. The method of claim 18 wherein the strain adjusting recess formed in said structural member and the strain adjusting aperture in said strain sensor are cylindrical.

20. The method of claim 19 wherein the step of forming a strain adjusting hole in said structural member comprises forming a hole in said structural member with a diameter that is smaller than the diameter of the strain adjusting aperture in said strain sensor.

21. The method of claim 20 wherein the step of forming a strain adjusting hole in said structural member comprises forming a hole in said structural member at a location that is offset from the strain adjusting aperture in said strain sensor.

22. The method of claim 21 wherein the step of forming a strain adjusting hole in said structural member comprises forming a hole in said structural member at a location that is offset from the strain adjusting perpendicular in said strain sensor in a direction perpendicular to said axis of sensitivity.

23. The method of claim 19 wherein said strain adjusting tool comprises a generally L-shaped member having a handle portion and a working portion, the working portion including a cylindrical distal end having a diameter approximately equal to the diameter of the strain adjusting recess in said structural member, the working portion including a cylindrical cam member adjacent the cylindrical end of said working portion, said cylindrical cam member having a diameter approximately equal to the diameter of the strain adjusting aperture in said strain sensor, the center of the cylindrical cam member being offset from the center of said cylindrical end by substantially the same distance that the center of the strain adjusting recess in said structural member is offset from the center of the strain adjusting aperture in said sensor body, wherein said step of engaging the strain adjusting recess of said structural member comprises inserting the cylindrical distal end of said tool into the strain adjusting recess in said structural member and the cam member into the strain adjusting aperture in said sensor body, and wherein said step of applying a force to said strain adjusting tool to cause said strain adjusting tool to apply a force to said strain sensor comprises rotating the handle portion of said tool to cause the working portion to apply a relative force between said sensor body and said structural member.

24. The method of claim 17 wherein first and second mounting holes are formed in said strain sensor at the first and second mounting locations of said strain sensor, respectively, and wherein said step of attaching said strain sensor to said structural member at said first and second mounting locations comprises:

forming first and second mounting holes in said structural member, said first and second mounting holes being spaced apart from each other by approximately the spacing between the first and second mounting holes in said strain sensor;

placing first and second fasteners through said first and second mounting holes of said sensor body, respectively, and through said first and second mounting holes in said structural member, respectively;

tightening said second fastener to fix the position of the strain sensor adjacent the second mounting hole of said strain sensor; and while applying said force to said strain adjusting tool, tightening said first fastener to fix the position of the strain sensor adjacent the first mounting hole of said strain sensor.

\* \* \* \* \*